(12) United States Patent
Amstutz et al.

(10) Patent No.: US 12,502,474 B2
(45) Date of Patent: Dec. 23, 2025

(54) DEVICES AND METHODS FOR INTERSTITIAL DECONGESTION

(71) Applicant: White Swell Medical Ltd, Kibbutz Shefayim (IL)

(72) Inventors: Jill Amstutz, Menlo Park, CA (US); Eamon Brady, Galway (IE); Yaacov Nitzan, Hertzelia (IL)

(73) Assignee: White Swell Medical Ltd, Kibbutz Shefayim (IL)

( * ) Notice: Subject to any disclaimer, the term of this patent is extended or adjusted under 35 U.S.C. 154(b) by 944 days.

(21) Appl. No.: 17/761,634

(22) PCT Filed: Sep. 18, 2020

(86) PCT No.: PCT/US2020/051568
§ 371 (c)(1),
(2) Date: Mar. 18, 2022

(87) PCT Pub. No.: WO2021/061525
PCT Pub. Date: Apr. 1, 2021

(65) Prior Publication Data
US 2022/0331510 A1 Oct. 20, 2022

Related U.S. Application Data

(60) Provisional application No. 62/905,501, filed on Sep. 25, 2019.

(51) Int. Cl.
*A61B 17/12* (2006.01)
*A61M 1/00* (2006.01)

(52) U.S. Cl.
CPC ......... *A61M 1/84* (2021.05); *A61B 17/12036* (2013.01); *A61B 17/12136* (2013.01)

(58) Field of Classification Search
CPC ....... A61B 17/12136; A61B 17/12045; A61M 2025/1052; A61M 25/10; A61M 25/0074;
(Continued)

(56) References Cited

U.S. PATENT DOCUMENTS 3,211,150 A 10/1965 Foderick
3,884,240 A 5/1975 Gilman
(Continued)

FOREIGN PATENT DOCUMENTS

EP 0526102 A1 2/1993
EP 2353501 A1 8/2011
(Continued)

OTHER PUBLICATIONS

Bannon, 2011, Anatomic considerations for central venous cannulation, Risk Manag Healthc Policy 4:27-39.
(Continued)

*Primary Examiner* — Deanna K Hall
(74) *Attorney, Agent, or Firm* — Brown Rudnick LLP; Adam M. Schoen

(57) ABSTRACT

Devices and methods of the disclosure use an intravascular catheter with deployable sealing elements to create a fluid trap around an outlet of a lymphatic duct and drain lymph passively to a collection vessel that may be pressurized to a predetermined pressure or a partial vacuum. Due to the fixed pressure, the device creates a low-pressure area at the lymphatic duct, which drains lymph passively without any mechanical pump or impeller. In certain aspects, a device includes a catheter for insertion into a vein of the venous angle of a patient, with proximal and distal sealing elements deployable to seal the vein to thereby define a fluid trap around the lymphatic outlet. A port within the fluid trap opens to a drainage lumen extending along the catheter to a collection vessel. The device may be configured such that
(Continued)

the drainage lumen passively drains the fluid trap into the collection vessel.

20 Claims, 11 Drawing Sheets

(58) Field of Classification Search
CPC ........ A61M 25/1018; A61M 2027/004; A61M 39/0208; A61M 27/00; A61M 1/84; A61M 25/04; A61F 2002/825
See application file for complete search history.

(56) References Cited

U.S. PATENT DOCUMENTS

| | | | |
|---|---|---|---|
| 3,926,175 | A | 12/1975 | Allen et al. |
| 4,714,460 | A | 12/1987 | Calderon |
| 4,822,341 | A | 4/1989 | Colone |
| 4,838,864 | A | 6/1989 | Peterson |
| 4,957,484 | A | 9/1990 | Murtfeldt |
| 5,005,564 | A | 4/1991 | Grundei et al. |
| 5,069,662 | A | 12/1991 | Bodden |
| 5,092,844 | A | 3/1992 | Schwartz et al. |
| 5,097,840 | A | 3/1992 | Wallace et al. |
| 5,366,504 | A | 11/1994 | Andersen et al. |
| 5,391,143 | A | 2/1995 | Kensey |
| 5,484,412 | A | 1/1996 | Pierpont |
| 5,509,897 | A | 4/1996 | Twardowski et al. |
| 5,554,119 | A | 9/1996 | Harrison et al. |
| 5,558,642 | A | 9/1996 | Schweich, Jr. et al. |
| 5,716,340 | A | 2/1998 | Schweich, Jr. et al. |
| 5,817,046 | A | 10/1998 | Glickman |
| 5,836,912 | A | 11/1998 | Kusleika |
| 5,893,841 | A | 4/1999 | Glickman |
| 5,897,533 | A | 4/1999 | Glickman |
| 5,908,407 | A | 6/1999 | Frazee et al. |
| 5,919,163 | A | 7/1999 | Glickman |
| 5,921,913 | A | 7/1999 | Siess |
| 6,042,569 | A | 3/2000 | Finch, Jr. et al. |
| 6,139,517 | A | 10/2000 | Macoviak et al. |
| 6,152,945 | A | 11/2000 | Bachinski et al. |
| 6,165,196 | A | 12/2000 | Stack et al. |
| 6,179,796 | B1 | 1/2001 | Waldridge |
| 6,183,492 | B1 | 2/2001 | Hart et al. |
| 6,248,091 | B1 | 6/2001 | Voelker |
| 6,254,563 | B1 | 7/2001 | Macoviak et al. |
| 6,503,224 | B1 | 1/2003 | Forman et al. |
| 6,524,323 | B1 | 2/2003 | Nash et al. |
| 6,555,057 | B1 | 4/2003 | Bendera |
| 6,616,623 | B1 | 9/2003 | Kutushov |
| 6,635,068 | B1 | 10/2003 | Dubrul et al. |
| 6,699,231 | B1 | 3/2004 | Sterman et al. |
| 6,878,140 | B2 | 4/2005 | Barbut |
| 6,936,057 | B1 | 8/2005 | Nobles |
| 7,022,097 | B2 | 4/2006 | Glickman |
| 7,195,608 | B2 | 3/2007 | Burnett |
| 7,645,259 | B2 | 1/2010 | Goldman |
| 7,766,892 | B2 | 8/2010 | Keren et al. |
| 7,780,628 | B1 | 8/2010 | Keren et al. |
| 8,109,880 | B1 | 2/2012 | Pranevicius et al. |
| 8,126,538 | B2 | 2/2012 | Shuros et al. |
| 8,216,122 | B2 | 7/2012 | Kung |
| 8,480,555 | B2 | 7/2013 | Kung |
| 8,679,057 | B2 | 3/2014 | Fulton, III et al. |
| 9,179,921 | B1 | 11/2015 | Morris |
| 9,405,942 | B2 | 8/2016 | Liao et al. |
| 9,421,316 | B2 | 8/2016 | Leeflang et al. |
| 9,433,713 | B2 | 9/2016 | Corbett et al. |
| 9,486,566 | B2 | 11/2016 | Siess |
| 9,533,054 | B2 | 1/2017 | Yan et al. |
| 9,533,084 | B2 | 1/2017 | Siess et al. |
| 9,642,991 | B2 | 5/2017 | Eversull et al. |
| 9,669,142 | B2 | 6/2017 | Spanier et al. |
| 9,669,144 | B2 | 6/2017 | Spanier et al. |
| 9,675,739 | B2 | 6/2017 | Tanner et al. |
| 9,682,223 | B2 | 6/2017 | Callaghan et al. |
| 9,750,861 | B2 | 9/2017 | Hastie et al. |
| 9,770,543 | B2 | 9/2017 | Tanner et al. |
| 9,878,080 | B2 | 1/2018 | Kaiser et al. |
| 9,901,722 | B2 * | 2/2018 | Nitzan ................ A61M 1/3653 |
| 10,149,684 | B2 | 12/2018 | Nitzan et al. |
| 10,154,846 | B2 | 12/2018 | Nitzan et al. |
| 10,195,405 | B2 | 2/2019 | Nitzan et al. |
| 10,207,086 | B2 | 2/2019 | Nitzan et al. |
| 10,226,604 | B2 | 3/2019 | Nitzan et al. |
| 10,226,605 | B2 | 3/2019 | Nitzan et al. |
| 10,245,363 | B1 | 4/2019 | Rowe |
| 10,285,708 | B2 | 5/2019 | Nitzan et al. |
| 10,300,254 | B2 | 5/2019 | Nitzan et al. |
| 10,639,460 | B2 | 5/2020 | Nitzan et al. |
| 10,653,871 | B2 | 5/2020 | Nitzan et al. |
| 10,709,878 | B2 | 7/2020 | Nitzan et al. |
| 10,912,873 | B2 | 2/2021 | Nitzan et al. |
| 10,926,069 | B2 | 2/2021 | Nitzan et al. |
| 10,960,189 | B2 | 3/2021 | Nitzan et al. |
| 11,166,730 | B2 | 11/2021 | Nitzan et al. |
| 11,179,550 | B2 | 11/2021 | Nitzan et al. |
| 11,179,551 | B2 | 11/2021 | Nitzan et al. |
| 11,179,552 | B2 | 11/2021 | Nitzan et al. |
| 2002/0010418 | A1 | 1/2002 | Lary et al. |
| 2003/0093109 | A1 | 5/2003 | Mauch |
| 2003/0134416 | A1 | 7/2003 | Yamanishi et al. |
| 2004/0006306 | A1 | 1/2004 | Evans et al. |
| 2004/0064091 | A1 | 4/2004 | Keren et al. |
| 2004/0147871 | A1 | 7/2004 | Burnett |
| 2004/0210296 | A1 | 10/2004 | Schmitt et al. |
| 2004/0230181 | A1 | 11/2004 | Cawood |
| 2005/0228474 | A1 | 10/2005 | Laguna |
| 2005/0251180 | A1 | 11/2005 | Burton et al. |
| 2006/0030814 | A1 | 2/2006 | Valencia et al. |
| 2006/0064059 | A1 | 3/2006 | Gelfand et al. |
| 2006/0100658 | A1 | 5/2006 | Obana et al. |
| 2006/0161095 | A1 | 7/2006 | Aboul-Hosn et al. |
| 2006/0178604 | A1 | 8/2006 | Alderman |
| 2007/0055299 | A1 | 3/2007 | Ishimaru et al. |
| 2007/0282303 | A1 | 12/2007 | Nash et al. |
| 2007/0282382 | A1 | 12/2007 | Shuros et al. |
| 2008/0009719 | A1 | 1/2008 | Shuros et al. |
| 2008/0015628 | A1 | 1/2008 | Dubrul et al. |
| 2008/0071135 | A1 | 3/2008 | Shaknovich |
| 2008/0097412 | A1 | 4/2008 | Shuros et al. |
| 2008/0103573 | A1 | 5/2008 | Gerber |
| 2008/0140000 | A1 | 6/2008 | Shuros et al. |
| 2008/0294228 | A1 | 11/2008 | Brooke et al. |
| 2009/0018526 | A1 | 1/2009 | Power et al. |
| 2009/0112184 | A1 | 4/2009 | Fierens et al. |
| 2009/0131785 | A1 | 5/2009 | Lee et al. |
| 2010/0168649 | A1 | 7/2010 | Schwartz et al. |
| 2010/0179389 | A1 | 7/2010 | Moroney, III et al. |
| 2010/0280451 | A1 | 11/2010 | Teeslink et al. |
| 2010/0318114 | A1 | 12/2010 | Pranevicius et al. |
| 2011/0004046 | A1 | 1/2011 | Campbell et al. |
| 2011/0092955 | A1 | 4/2011 | Purdy et al. |
| 2011/0257462 | A1 | 10/2011 | Rodefeld et al. |
| 2011/0276023 | A1 | 11/2011 | Leeflang et al. |
| 2011/0282274 | A1 | 11/2011 | Fulton, III |
| 2011/0295302 | A1 | 12/2011 | Mohl |
| 2012/0029466 | A1 | 2/2012 | Callaghan et al. |
| 2012/0157913 | A1 | 6/2012 | Aziz et al. |
| 2012/0178986 | A1 | 7/2012 | Campbell et al. |
| 2012/0259215 | A1 | 10/2012 | Gerrans et al. |
| 2013/0096476 | A1 | 4/2013 | Rogachevsky |
| 2013/0096494 | A1 | 4/2013 | Kassab |
| 2013/0138041 | A1 | 5/2013 | Smisson, III et al. |
| 2013/0177432 | A1 | 7/2013 | Toellner et al. |
| 2013/0237954 | A1 | 9/2013 | Shuros et al. |
| 2013/0245607 | A1 | 9/2013 | Eversull et al. |
| 2013/0303969 | A1 | 11/2013 | Keenan et al. |
| 2013/0317535 | A1 | 11/2013 | Demmy |
| 2013/0331814 | A1 | 12/2013 | Fulton, III et al. |
| 2013/0338559 | A1 | 12/2013 | Franano et al. |
| 2014/0010686 | A1 | 1/2014 | Tanner et al. |
| 2014/0128659 | A1 | 5/2014 | Heuring et al. |
| 2014/0142616 | A1 | 5/2014 | Smith |
| 2014/0155815 | A1 | 6/2014 | Fulton, III et al. |

(56) References Cited

U.S. PATENT DOCUMENTS

| | | |
|---|---|---|
| 2014/0220617 A1 | 8/2014 | Yung et al. |
| 2014/0243790 A1 | 8/2014 | Callaghan et al. |
| 2014/0249386 A1 | 9/2014 | Caron et al. |
| 2014/0296615 A1 | 10/2014 | Franano |
| 2014/0303461 A1 | 10/2014 | Callaghan et al. |
| 2014/0336551 A1 | 11/2014 | Mantese et al. |
| 2014/0358036 A1 | 12/2014 | Holmes |
| 2015/0051634 A1 | 2/2015 | Kravik et al. |
| 2015/0157777 A1 | 6/2015 | Tuval et al. |
| 2015/0164662 A1 | 6/2015 | Tuval |
| 2015/0238671 A1 | 8/2015 | Mesallum |
| 2015/0283360 A1 | 10/2015 | Kelly |
| 2015/0343136 A1 | 12/2015 | Nitzan et al. |
| 2015/0343186 A1 | 12/2015 | Nitzan et al. |
| 2016/0022890 A1 | 1/2016 | Schwammenthal et al. |
| 2016/0045203 A1 | 2/2016 | Pollock |
| 2016/0051741 A1 | 2/2016 | Schwammenthal et al. |
| 2016/0129266 A1 | 5/2016 | Schmidt |
| 2016/0166463 A1 | 6/2016 | Douglas et al. |
| 2016/0169630 A1 | 6/2016 | Augustine et al. |
| 2016/0213826 A1 | 7/2016 | Tanner et al. |
| 2016/0331378 A1 | 11/2016 | Nitzan et al. |
| 2017/0014563 A1 | 1/2017 | Khir |
| 2017/0095395 A1 | 4/2017 | Wennen et al. |
| 2017/0197021 A1 | 7/2017 | Nitzan et al. |
| 2017/0224512 A1 | 8/2017 | Hingston |
| 2017/0319764 A1 | 11/2017 | Tanner et al. |
| 2018/0012630 A1 | 1/2018 | Thomee et al. |
| 2018/0125499 A1 | 5/2018 | Nitzan et al. |
| 2018/0126130 A1 | 5/2018 | Nitzan et al. |
| 2018/0146968 A1 | 5/2018 | Nitzan et al. |
| 2018/0185622 A1 | 7/2018 | Nitzan et al. |
| 2018/0193614 A1 | 7/2018 | Nitzan et al. |
| 2018/0193615 A1 | 7/2018 | Nitzan et al. |
| 2018/0193616 A1 | 7/2018 | Nitzan et al. |
| 2018/0250456 A1* | 9/2018 | Nitzan .................. A61M 60/30 |
| 2018/0303986 A1 | 10/2018 | Meacham |
| 2019/0014991 A1 | 1/2019 | Maki et al. |
| 2019/0046706 A1 | 2/2019 | Aboul-Hosn et al. |
| 2019/0046707 A1 | 2/2019 | Aboul-Hosn et al. |
| 2019/0083761 A1 | 3/2019 | Nitzan et al. |
| 2019/0117943 A1 | 4/2019 | Nitzan et al. |
| 2019/0117944 A1 | 4/2019 | Nitzan et al. |
| 2019/0126014 A1 | 5/2019 | Kapur et al. |
| 2019/0167878 A1 | 6/2019 | Rowe |
| 2019/0223877 A1 | 7/2019 | Nitzan et al. |
| 2019/0366063 A1 | 12/2019 | Nitzan et al. |
| 2020/0016383 A1 | 1/2020 | Nitzan et al. |
| 2020/0030586 A1 | 1/2020 | Nitzan et al. |
| 2020/0030587 A1 | 1/2020 | Nitzan et al. |
| 2020/0046372 A1 | 2/2020 | Nitzan |
| 2020/0054867 A1* | 2/2020 | Schwartz .......... A61M 39/0208 |
| 2020/0206485 A1 | 7/2020 | Nitzan et al. |
| 2020/0230380 A1 | 7/2020 | Nitzan et al. |
| 2020/0230381 A1 | 7/2020 | Nitzan et al. |
| 2020/0261706 A1 | 8/2020 | Nitzan et al. |
| 2020/0268951 A1 | 8/2020 | Nitzan et al. |
| 2020/0268952 A1 | 8/2020 | Nitzan et al. |
| 2020/0268954 A1 | 8/2020 | Nitzan et al. |
| 2020/0269025 A1 | 8/2020 | Nitzan et al. |
| 2020/0276369 A1 | 9/2020 | Nitzan et al. |
| 2020/0306436 A1 | 10/2020 | Tanner et al. |
| 2020/0397963 A1 | 12/2020 | Nitzan et al. |
| 2021/0121678 A1 | 4/2021 | Nitzan et al. |
| 2021/0378676 A1 | 12/2021 | Keating et al. |
| 2021/0378677 A1 | 12/2021 | Keating et al. |
| 2021/0378678 A1 | 12/2021 | Keating et al. |
| 2021/0379329 A1 | 12/2021 | Keating et al. |
| 2022/0039803 A1 | 2/2022 | Nitzan et al. |
| 2022/0104827 A1 | 4/2022 | Keating et al. |
| 2022/0104828 A1 | 4/2022 | Keating et al. |

FOREIGN PATENT DOCUMENTS

| | | | |
|---|---|---|---|
| EP | 2353503 | A1 | 8/2011 |
| EP | 2353632 | A1 | 8/2011 |
| EP | 2637927 | A1 | 9/2013 |
| WO | 89/04193 | A1 | 5/1989 |
| WO | 2000/024337 | A2 | 5/2000 |
| WO | 01/013983 | A2 | 3/2001 |
| WO | 2012/135834 | A2 | 10/2012 |
| WO | 2013/025826 | A1 | 2/2013 |
| WO | 2013/061281 | A1 | 5/2013 |
| WO | 2014/113821 | A1 | 7/2014 |
| WO | 2014/141284 | A2 | 9/2014 |
| WO | 2015/186003 | A2 | 12/2015 |
| WO | 2017/087556 | A1 | 5/2017 |
| WO | 2018172848 | A2 | 9/2018 |
| WO | 2020/037084 | A1 | 2/2020 |
| WO | 2020/174285 | A2 | 9/2020 |

OTHER PUBLICATIONS

Biran, 2017, Heparin coatings for improving blood compatibility of medical devices, Adv Drug Delivery Rev, 112:12-23.

Blitz, 2014, Pump thrombosis—a riddle wrapped in a mystery inside an enigma, Ann Cardiothorac Surg, 3(5):450-471.

Chikly, 2005, Manual techniques addressing the lymphatic system: origins and development, JAOA 105(10):457-464.

Moscucci, 2014, Section III Hemodynamic principles 10 Pressure measurement, 223-244 in Grossman & Baim's Cardiac Catheterization, Angiography, and Intervention 8 Ed, 26 pages.

Ratnayake, 2018, The Anatomy and physiology of the terminal thoracic duct and ostial valve in health and disease: potential implications for intervention, J Anat 233:1-14.

Shimizu, 2014, Embolization of a fractured central venous catheter placed using the internal jugular apporach, Int J Surg Case Rep 5:219-221.

Stone, 2010, The effect of rigid cervical collars on internal jugular vein dimensions, Acad Emerg Med 17(1):100-102.

Swan, 1970, Catheterization of the Heart in Man with Use of a Flow-directed Balloon-tipped Catheter, NEJM 283 (9):447-451.

Tchantchaleishvili, 2014, Evaluation and treatment of pump thrombosis and hemolysis, Ann Cardiothorac Surg, 3(5):490-495.

Webb, 2012, Roughness parameters for standard description of surface nanoarchitecture, Scanning 34:257-263.

Yancy, 2013, 2013 ACCF/AHA Guideline for the Management of Heart Failure, Circulation 128(16):e240-e327.

\* cited by examiner

DEVICES AND METHODS FOR INTERSTITIAL DECONGESTION

CROSS-REFERENCE TO RELATED APPLICATIONS

This application is a U.S. national stage entry of international application No. PCT/US2020/051568, filed Sep. 18, 2020, which application claims the benefit of, and priority to, U.S. Provisional Application No. 62/905,501, filed Sep. 25, 2019, the contents of which are incorporated by reference.

TECHNICAL FIELD

The disclosure relates to heart failure and edema.

BACKGROUND

Heart failure, sometimes referred to as congestive heart failure (CHF), occurs when the heart is unable to pump sufficiently to maintain blood flow to meet the body's needs. A person suffering heart failure may experience shortness of breath, exhaustion, and swollen limbs. Heart failure is a common, costly, and potentially fatal condition. In 2015 it affected about 40 million people globally with around 2% of adults overall having heart failure. As many as 10% of people over the age of 65 are susceptible to heart failure.

In heart failure, the pressures in the heart ventricles and atria are excessively elevated. As a result, the heart works harder to eject blood, leading to a buildup of blood pressure, which may result in edema forming within interstitial compartments of the body. Edema refers to the abnormal accumulation of fluid in tissues of the body and results when elevated blood pressure prevents lymphatic fluid from draining from the interstitium. The additional work of the heart, with time, weakens and remodels the heart thus further reducing the ability of the heart to function properly. The fluid accumulation leads to dyspnea and acute decompensated heart failure (ADHF) hospitalization. Those conditions may result in severe health consequences including death.

SUMMARY

This disclosure provides devices and methods for interstitial decongestion that operate to passively drain liquid from a body. Devices and methods of the disclosure use an intravascular catheter with deployable sealing elements to create a fluid trap around an outlet of a vessel, such as an outlet of a lymphatic duct. The catheter drains the fluid trap, thereby draining lymph from the lymphatic duct. The lymph drains through a lumen through the catheter, to a collection vessel that may be exterior to a body of the patient. This disclosure provides devices and methods for interstitial decongestion that operate to passively a liquid from a body. Devices and methods of the disclosure are configured to isolate the liquid from a second, different liquid and to drain the liquid from the body without further mixing or intermingling the liquids. Unlike prior art devices, devices and methods of the disclosure may be used to isolate lymph fluid from venous blood at the thoracic duct. In contrast, some prior art devices allowed such fluids to mix and/or withdrew both together from the body.

Devices and methods of the disclosure are useful to isolate lymph fluid from venous blood with the fluid trap. The disclosure employs the insight that different fluids such as blood and lymph play different roles within a patient and that there may be benefits in an ability to segregate or selectively address one such fluid that otherwise normally mixes with the other. For example, blood is extremely valuable to the patient. Lymph fluid where it is high in plasma proteins is also valuable. Lymph fluid that has a low protein concentration has less value and can be discarded (or concentrated to increase its value to the patient). One object of the disclosure is to provide methods and devices that may be used to treat edema and to retain or return the more valuable bodily fluids to the patient while rapidly draining less valuable fluids from interstitial tissues to thereby relieve congestion.

In some embodiments, methods and devices of the disclosure are used to remove lymph fluid from a patient. The first few hundred milliliters of lymph fluid removed with this procedure will typically have the highest protein content (maybe up to 85%) and these fluids may be returned to the patient. Once the thoracic duct has drained (e.g., at least that initial time) then the protein concentration of fresh fast flowing lymph will be lower and this fluid does not need to be returned to the patient. Preferably, the lymph is removed by an intravascular catheter device that is useful to sequester an outlet of a lymphatic duct within a fluid trap and then drain any fluids in that fluid trap—which includes lymph draining from that lymphatic duct—out through the catheter to a collection vessel. The device preferably drains the lymph passively, i.e., without any pump or mechanical device, by virtue of a pressure differential presented to the lymphatic duct at the fluid trap. The fluid trap may present a pressure differential by means of a connection (via a drainage lumen) to a collection vessel that is maintained at a pressure that is effective to promote the flow of lymph from the duct.

The collection vessel can be pressurized to a predetermined pressure, e.g., less than about 10 mm Hg, or even less than about zero mm Hg, i.e., a partial vacuum. The collection vessel may be pressurized a pressure in mm Hg less than about 5, 0, −5, or −10. Due to the fixed low pressure in the collection vessel, and via the fluidic connection to the fluid trap through the lumen, the device creates a low-pressure area around the outlet of the lymphatic duct. This establishes a pressure differential across the outlet, which promotes the flow and drainage of lymph.

The collection vessel may be pre-pressurized. For example, a pressure within the vessel may be <10 mm Hg, or even a partial vacuum, before the devices is introduced to a patient. The low pressure through the drainage lumen and fluid trap causes lymph to drain passively, without any mechanical pumps or moving parts. The passive drainage of lymph avoids prior art problems with mechanical impellers or pumps, which are associated with hemolysis and mechanical difficulties. Without the mechanical complexities of impellers or pumps, devices and methods of the disclosure operate simply and without excessive expense. Using little more than radiographic guidance, a catheter can be inserted into a venous angle of a patient affected by edema or even undergoing congestive heart failure. Once the sealing elements are deployed, the fluid trap can hydrostatically isolate the lymphatic duct from the circulatory system and passively drain lymph out to the collection vessel. Preferred embodiments include a bypass channel along or through the catheter, to allow blood to flow past the fluid trap and return to the heart.

Because the device passively drains lymph from the patient's lymphatic system, it quickly and effectively relieves symptoms of edema. This may be used to provide life-saving interventions for patients undergoing congestive heart failure, and also to promote the regular and healthy drainage of the lymphatic system. Devices of the disclosure are beneficial because they are simple devices that operate passively and are easily insertable into, and removable from, the patient. Devices and methods of the disclosure do not require or rely on chemical diuretic therapy. Treating using a passive drainage catheter of the disclosure presents a very low risk of depletion episodes. Additionally, devices of the disclosure are simple to use and require very little management.

Devices and methods of the disclosure are attractive because they offer the potential to remove a significant amount of interstitial fluid. Significantly, devices of the disclosure offer clinicians great control of a volume of fluid that is removed. For example devices may include transparent collect devices and stop-cocks or shut-off valves to allow a clinician precise control over fluid removal. The collection vessel may be actively pressurized by means of a live connection to a compressor or vacuum pump. Or, devices may use a collection vessel that is pre-pressurized and presents a partial vacuum or precisely controlled pressure to the catheter when attached and inserted. Devices may work at ambient atmospheric pressure as well. Devices may also be used to treat lymph (e.g., enrich for proteins) and return the fluid into the patient's circulatory system.

In certain aspects, the disclosure provides a device for treating edema. The device includes a catheter with an extended body dimensioned for insertion into a vein of the venous angle of a patient, with proximal and distal sealing elements disposed about a distal portion of the catheter. The proximal and distal sealing elements are deployable to seal the vein to thereby define a fluid trap between them. There is a port into a side of the catheter between the proximal and distal sealing elements and a drainage lumen extending from the port, along the catheter, and into a collection vessel connected to a proximal portion of the catheter. The device is configured such that the drainage lumen passively drains the fluid trap into the collection vessel. When the catheter is inserted into the venous angle and the proximal and distal sealing elements are deployed, the collection vessel may be exterior to the patient and in fluidic communication with the fluid trap via the drainage lumen. In certain embodiments, the collection vessel is pressurized to a predetermined pressure (e.g., <10 mm Hg or <0 mm Hg). Preferably, when the proximal and distal sealing elements are deployed upstream and downstream of an outlet of a lymphatic duct, the collection vessel presents a pressure differential that passively (e.g., without a mechanical pump) draws lymph from the lymphatic duct through the lumen.

The device may include a bypass channel extending between the proximal and distal sealing elements such that, when the proximal and distal sealing elements are deployed, blood flows through the vein via the bypass channel. The bypass channel extending between the proximal and distal sealing elements may be hydrostatically isolated from the fluid trap. In some embodiments, a collapsible membrane extends between the proximal and distal sealing elements. When the proximal and distal sealing elements are in a collapsed configuration, the collapsible membrane assumes a collapsed configuration, and when the proximal and distal sealing elements are deployed, the collapsible membrane expands to provide a bypass channel extending between the proximal and distal sealing elements. Preferably, when collapsed, the distal portion of the catheter fits through an approximately 15 Fr trocar.

In certain embodiments, the device includes a recovery sheath surrounding the extended body of the catheter by which the proximal and distal sealing elements can be restricted to a collapsed configuration by drawing the distal portion of the catheter into the recovery sheath.

In some embodiments, either of the proximal and distal sealing elements or both comprise a scaffold, which may include a material or structure such as a super elastic, a shape-memory material, a wire mesh structure, a machined or laser machined tube structure, a 3D printed structure, or a monolithic structure. The scaffold may include a distal region configured to expand and appose a distal section of the vein; a reduced cross-sectional area section through the fluid trap; and a proximal region configured to expand and appose a proximal section of the vein. The scaffold may linked to the catheter via one or more struts that collapse the scaffold when the distal portion of the catheter is pulled into a recovery sheath.

Pressure in the collection vessel may be maintained at about local atmospheric pressure. Or, the collection vessel may be pressurized. In some embodiments, the collection vessel is connected to a pressure reducing device so that the collection vessel presents a partial vacuum to the drainage lumen when the device is used in treatment.

The device may include a return tube for returning a collected fluid to a venous system of the patient. In some embodiments, the collection vessel includes a fluid separation assembly to enrich a protein content of fluid collected therein. A fluid separation assembly may have first and second compartments separated by semi permeable membrane, e.g., such that the drainage lumen drains to the first compartment while the second compartment comprises a hypotonic solute. When lymph is drained into the first compartment, the solute draws water out of the first compartment, enriching the lymph for proteins.

Aspects of the disclosure provide a method of treating edema. The method include positioning a distal portion of a treatment catheter in a vein near a venous angle of a patient, deploying first and second expandable members on the distal portion of the catheter upstream and downstream of an outlet of a lymphatic duct to thereby create a fluid trap that includes the outlet—wherein the treatment device presents a port within the fluid trap, the port opening to a drainage lumen that extends away from the venous angle, and draining lymph passively from the lymphatic duct, through the drainage lumen, and into a collection vessel. The lymph drains passively by means of a pressure differential between the lymphatic duct and the fluid trap that is introduced when the first and second expandable members are deployed. In some embodiments, the collection vessel is pressurized to a predetermined pressure.

In certain embodiments, the catheter includes a bypass channel extending between the proximal and distal sealing elements. When the proximal and distal sealing elements are deployed, blood flows through the vein via the bypass channel. The bypass channel may be hydrostatically isolated from the fluid trap. For the bypass channel, the treatment device may include a collapsible membrane extending between the proximal and distal sealing elements. When the proximal and distal sealing elements are in a collapsed configuration, the collapsible membrane assumes a collapsed configuration, and a distal portion of the catheter fits through an approximately 14 Fr trocar, and when the proximal and distal sealing elements are deployed, the collapsible membrane expands to provide a bypass channel extending between the proximal and distal sealing elements, wherein when the catheter is inserted into the venous angle and the proximal and distal sealing elements are deployed, the collection vessel is exterior to the patient and in fluidic communication with the fluid trap via the drainage lumen.

The device may include a recovery sheath surrounding the extended body of the catheter, by which the proximal and distal sealing elements can be restricted to a collapsed configuration by drawing the distal portion of the catheter into the recovery sheath.

In some embodiments, the proximal and distal sealing elements comprise a scaffold. The scaffold may include a distal region configured to expand and appose a distal section of the vein; a reduced cross-sectional area section through the fluid trap; and a proximal region configured to expand and appose a proximal section of the vein. In the scaffold embodiments, balloon embodiments, or other embodiments, the first and second expandable members may be retained in a collapsed configuration by a recovery sheath during the positioning step, and the method may further include placing the first and second expandable members in an expanded configuration by pulling the recover sheath back over the catheter.

Draining the lymph passively may be accomplished by means of a pressure maintained in the collection vessel that is lower than a hydrostatic pressure at the outlet before the method is performed. The method may include enriching a protein content of the drained lymph. Enriching may be done using a fluid separation assembly comprising first and second compartments separated by semi permeable membrane, wherein the drainage lumen drains to the first compartment and the second compartment comprises a hypotonic solute, wherein, when lymph is drained into the first compartment, the solute draws water out of the first compartment, enriching the lymph for proteins. The method may include returning fluid into a venous system of the patient through a return tube.

DETAILED DESCRIPTION

Provided are methods and devices for treating edema in a patient that use a catheter and a collector. The catheter may include an expandable member and an elongate shaft, the expandable member configured for insertion into a vessel and placement at a treatment site in said vessel. The expandable member comprises proximal and distal sealing elements that may be deployed to define a fluid trap region between them. The fluid trap draws body fluid from a branch vessel that is in connection with the fluid trap. The fluid trap includes a port connected to the elongate shaft. Preferably the treatment site comprises a systemic junction of vascular systems. The systemic junction may comprise the junction of a first vascular system carrying a first bodily fluid with a second vascular system carrying a second bodily fluid. In some embodiments, the systemic junction of vascular systems further comprises a region where said first body fluid mixes with said second body fluid and said sealing elements are configured to substantially prevent mixing of said first and said second bodily fluids. Said proximal and/or said distal sealing elements may comprise a plurality of sealing elements with said fluid trap comprising a continuous space between said plurality of proximal and/or distal sealing elements. Optionally, the systemic junction comprises a junction between the lymphatic system and the vascular system and the first bodily fluid is substantially lymph fluid. In certain embodiments, the expandable member comprises a collapsed delivery configuration and an expanded vessel apposing configuration; the expandable member may be configured to be collapsed in said vessel for retrieval.

Figure 1:
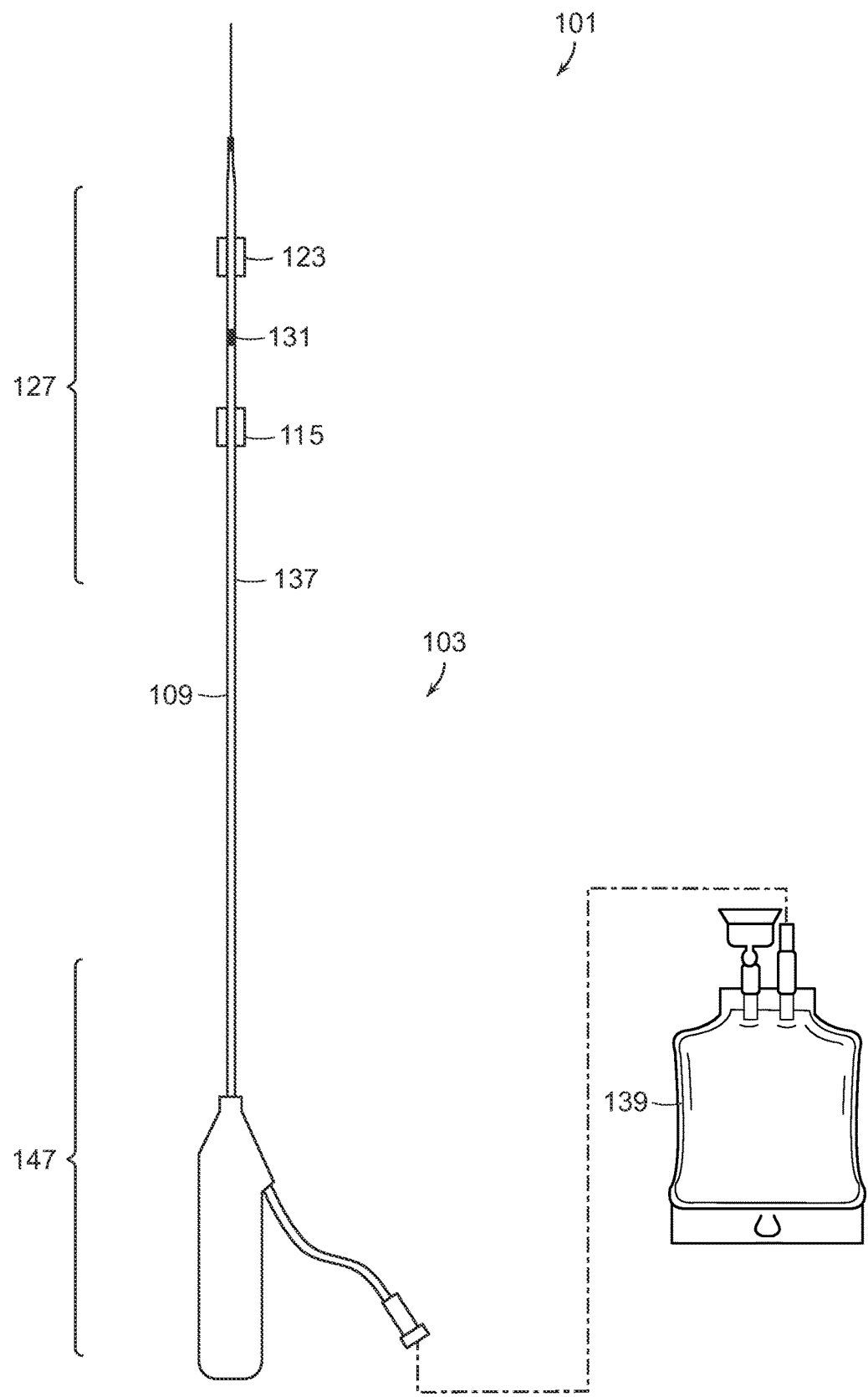
FIG. 1 shows a device for treating edema.

FIG. 1 shows a device 101 for treating edema. The device includes a catheter 103 comprising an extended body 109 dimensioned for insertion into a vein of the venous angle of a patient. A proximal sealing element 115 and a distal sealing element 123 are disposed about a distal portion 127 of the catheter. Each of the proximal sealing element 115 and a distal sealing element 123 are deployable to seal the vein to thereby define a fluid trap between the proximal and distal sealing elements. The catheter 103 includes a port 131 into a side of the catheter 103 between the proximal and distal sealing elements 115, 123 and a drainage lumen 137 extending from the port, along through the catheter 103, and into a collection vessel 139 connected to a proximal portion 147 of the catheter 103. The device 101 is configured such that the drainage lumen 137 passively drains the fluid trap into the collection vessel.

Figure 2:
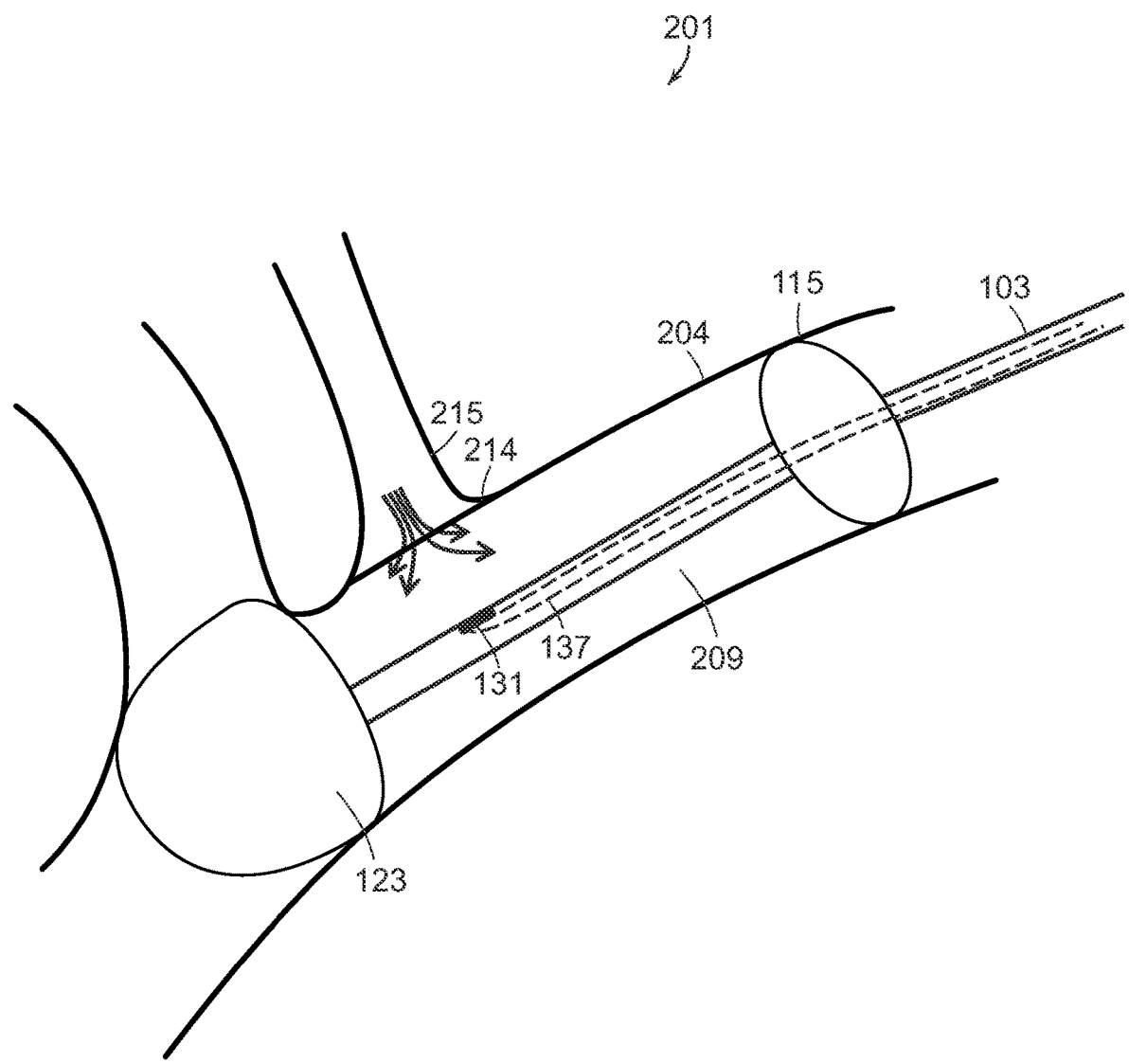
FIG. 2 shows the catheter within a venous angle of a patient.

FIG. 2 shows the catheter 103 inserted into a vein 204 of the venous angle 201 of a patient. The proximal sealing element 115 and the distal sealing element 123 are in a deployed configuration, each sealing the vein 204 to thereby define a fluid trap 209 between them. In preferred embodiments, the proximal and distal sealing elements 115, 123 can each be deployed to fully seal the vein 204. Each of the proximal and distal sealing elements 115, 123 expands and presses an inner surface of the vein 204, creating a seal there. When the catheter 103 is inserted into the venous angle 201 and the proximal and distal sealing elements 115, 123 are deployed, the collection vessel 139 is preferably exterior to the patient and in fluidic communication with the fluid trap 209 via the drainage lumen 137 and the port 131. In the depicted embodiment, an outlet 214 of a lymphatic duct is within the fluid trap 209.

Each of the proximal and distal sealing elements 115, 123 creates a seal in the vein 204 in that the fluid trap 209 is fluidically isolated from upstream and downstream portions of the vein 204. However, blood may still flow through the vein using embodiments of the device 101 that include a bypass channel.

Figure 3:
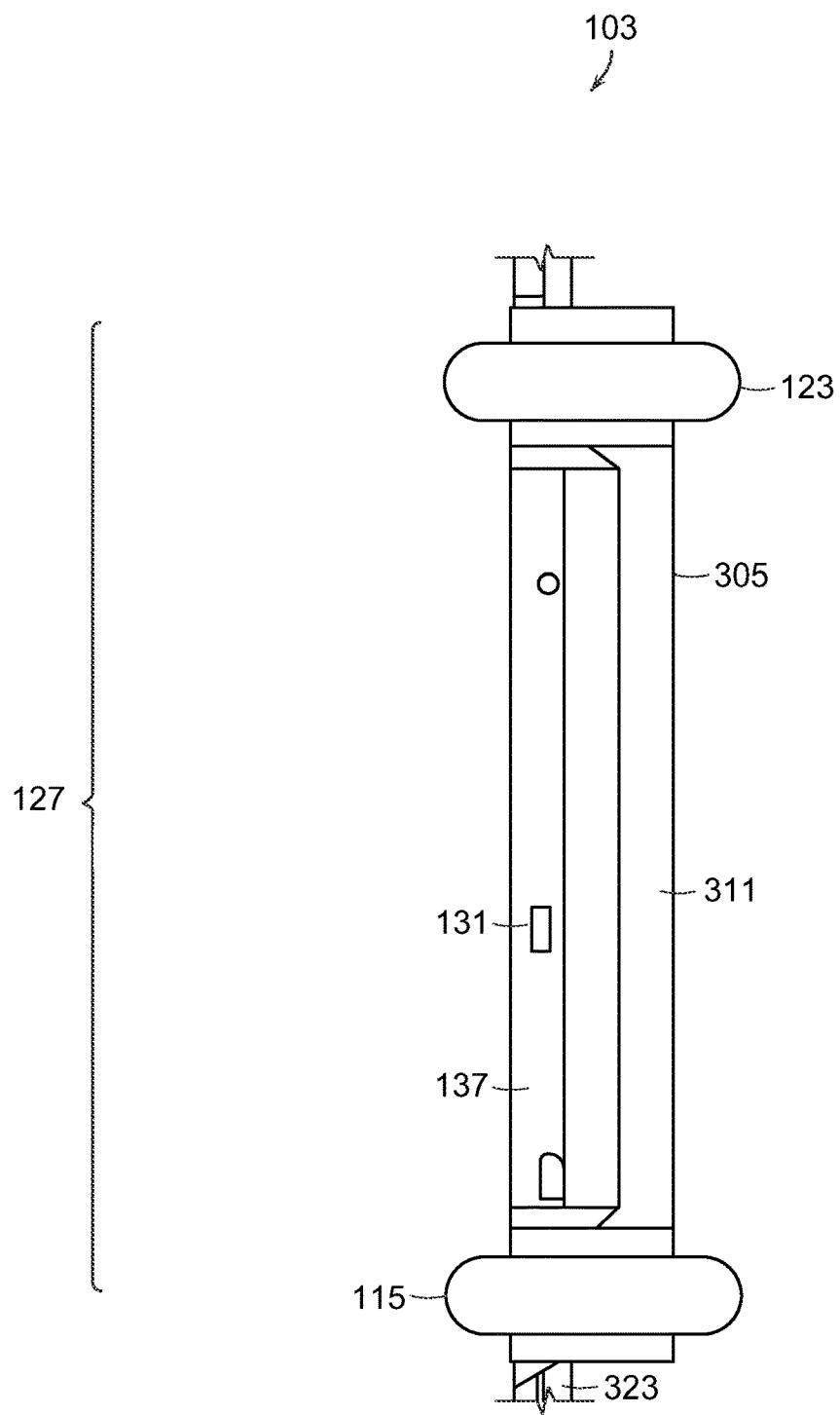
FIG. 3 shows proximal and distal sealing elements in a deployed state.

FIG. 3 shows the distal portion 127 of the catheter 103 with the proximal and distal sealing elements 115, 123 in a deployed state according to certain embodiments. A collapsible membrane 305 extends between the proximal sealing element 115 and the distal sealing element 123. When the proximal sealing element 115 and the distal sealing element 123 are in the deployed state, the collapsible membrane 305 is in an expanded state, defining a bypass channel 311 extending between the proximal and distal sealing elements 115, 123. When the proximal and distal sealing elements 115, 123 are deployed, blood can flow through the vein 204 via the bypass channel 311.

In some embodiments, the proximal sealing element 115 and the distal sealing element 123 are inflatable balloons. In the depicted embodiment, the catheter 103 may include an inflation lumen 323 extending along its length. An inflation supply (not pictured) may be connected to a proximal portion 147 of the catheter to inflate and deflate the balloons that form the proximal sealing element 115 and the distal sealing element 123. Thus, certain embodiments provide a device 101 that includes a collapsible membrane 305 extending between the proximal and distal sealing elements 115, 123. When the proximal and distal sealing elements 115, 123 are in a collapsed configuration, the collapsible membrane 305 assumes a collapsed configuration, and the distal portion 127 of the catheter 103 preferably fits through a trocar, e.g., about a 20 mm trocar, more preferably through about a 5 mm/15 Fr trocar. When the proximal and distal sealing elements 115, 123 are deployed, the collapsible membrane 305 expands to provide a bypass channel 311 extending between the proximal and distal sealing elements 115, 123.

Any suitable material or construction may be used for the proximal sealing element 115 and the distal sealing element 123. As discussed, either of both of the proximal sealing element 115 and the distal sealing element 123 may be provided by a balloon. In other embodiments, either or both of the proximal sealing element 115 and the distal sealing element 123 may be a collapsible lattice or stent-like device optionally carrying a sealing membrane (e.g., Tyvek or impermeable rubber or PEEK cemented to plastic or nitinol struts or ribs, for example). One feature of the sealing elements is that they seal the fluid trap 209 to be fluidically isolated from upstream and downstream portions of the vein 204. Because the collection vessel 139 may be pressurized to a pressure that is, for example, lower than the blood pressure in the venous angle 201 of a patient undergoing congestive heart failure, when the device 101 is deployed (e.g., as shown in FIG. 2) in a patient undergoing heart failure, the fluid trap 209 presents a local zone of low pressure at the outlet 214 of the lymphatic duct 215 causing lymph to drain.

This result may be promoted by pressurizing the collection vessel 139 in a desired manner, for example, by pressurizing the collection vessel to a predetermined pressure, such as any predetermined pressure under about 15 mm Hg, preferably less than about 10 mm Hg and more preferably lower, even, e.g., beneath about 0 mm Hg.

Figure 4:
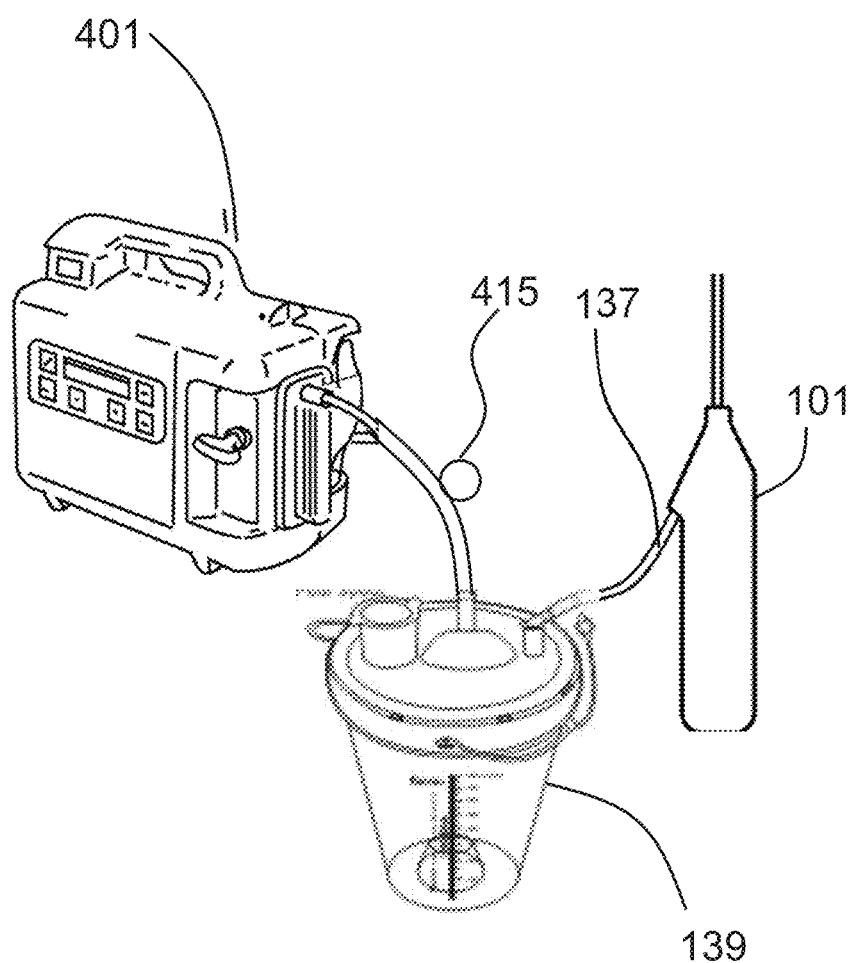
FIG. 4 shows a collection vessel pressurized to a predetermined pressure.

FIG. 4 shows an embodiment in which the collection vessel 139 is pressurized to a predetermined pressure. In the depicted embodiment, the collection vessel 419 is connected to a pressurizing device 401 which may be used to pressurize an interior of the collection vessel 139 to any suitable pressure, such as a pre-determined pressure. For example, the pressurizing device 401 may be a vacuum pump that creates a partial vacuum in the collection vessel 139, so that the collection vessel 139 may present a partial vacuum to the drainage lumen 137 when the device 101 is used in treatment. Any suitable pressurizing device 401 may be used such as, for example, a vacuum pump. The pressurizing device 401 may be used to create a partial or full vacuum in the collection vessel 139. Similarly, the pressurizing device may be, for example, a compressor useful to increase pressure in the collection vessel 139, e.g., to a predetermined pressure (such as up to, but less than, 10 mm Hg). A pressure in the collection vessel 139 may be equal to the local atmospheric pressure. The pressurizing device may include a pressure gauge 415 to confirm or monitor the pressure of in the collection vessel 139. Pressurizing the collection vessel 139 may be done independently of treating the patient with the device 101, or simultaneously.

A feature of the device 101 is that the device 101 drains lymph passively in that, once the fluid trap 209 surrounds the outlet 214 of the lymphatic duct 215, the pressurized (e.g., very low pressure, or partial vacuum) collection vessel 139 can establish a pressure differential between the lymphatic duct 215 and the fluid trap 209 (as well as the drainage lumen 137 and the collection vessel 139). One of skill in the art will appreciate that when the proximal and distal sealing elements 115, 123 are deployed upstream and downstream of the outlet 214 of the lymphatic duct 215, the collection vessel 139 presents a pressure differential that draws lymph from the lymphatic duct 215 through the lumen 137.

The fluid trap 209 is created when the proximal and distal sealing elements 115, 123 are deployed upstream and downstream of the outlet 214 of the lymphatic duct 215. Any suitable construction or material may be used for the proximal and distal sealing elements 115, 123.

Figure 5A:
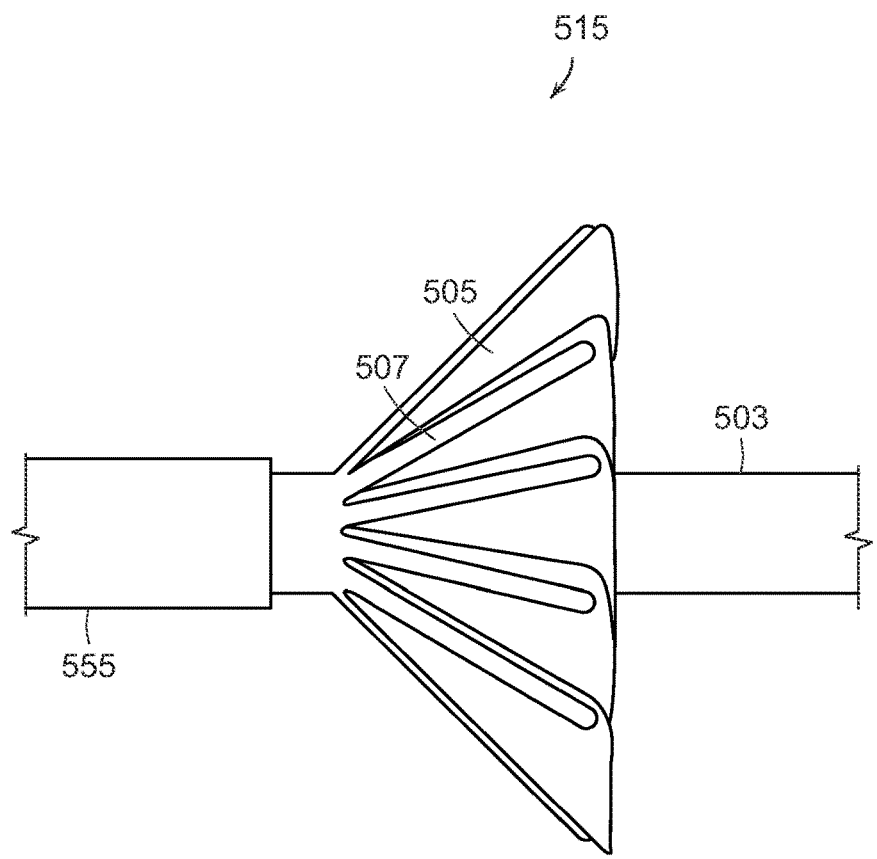
FIG. 5A shows a sealing element that includes a scaffold.

FIG. 5A shows a sealing element 515 on a catheter 503 that may be employed. In the depicted embodiment, the catheter 503 includes a proximal sealing element 515 and a distal sealing element (not shown) that includes a scaffold. Any suitable material or construction may be used for the scaffold of the sealing element 515. The sealing element 515 may include a scaffold that comprises a super elastic material; a shape memory material; a wire mesh structure; a machined or laser machined tube structure; a three-D printed structure; or a monolithic structure. In the depicted embodiment, the scaffold of the sealing element is provided by a plurality of struts 507, each attached to a flexible blade 505. For example, the struts 507 may be plastic and the blades 505 may be PEEK or rubber. In the depicted embodiment, the sealing element 515 is in a deployed configuration, connected to the catheter 503. The catheter 503 also includes a recover sheath 555. The recovery sheath preferably surrounds the catheter and is able to slide axially along the catheter 503. The catheter 503 is preferably constructed such that a proximal end of the recovery sheath 555 and the catheter 503 are outside of a patient's body when the distal portion of the catheter 503 is inserted into a venous angle 201.

Figure 5B:
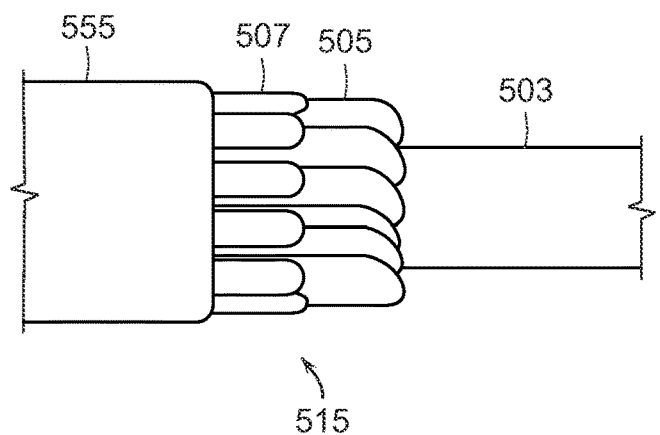
FIG. 5B shows the sealing element in a collapsed configuration.

FIG. 5B shows the sealing element in a collapsed configuration. The scaffold is linked to the catheter 503 via one or more struts that collapse 507 the scaffold when the distal portion of the catheter 503 is pulled into a recovery sheath 555. Preferably on the catheter 503 the scaffold comprises: a distal region configured to expand and appose a distal section of the vein; a reduced cross-sectional area section through the fluid trap; and a proximal region configured to expand and appose a proximal section of the vein.

Figure 6:
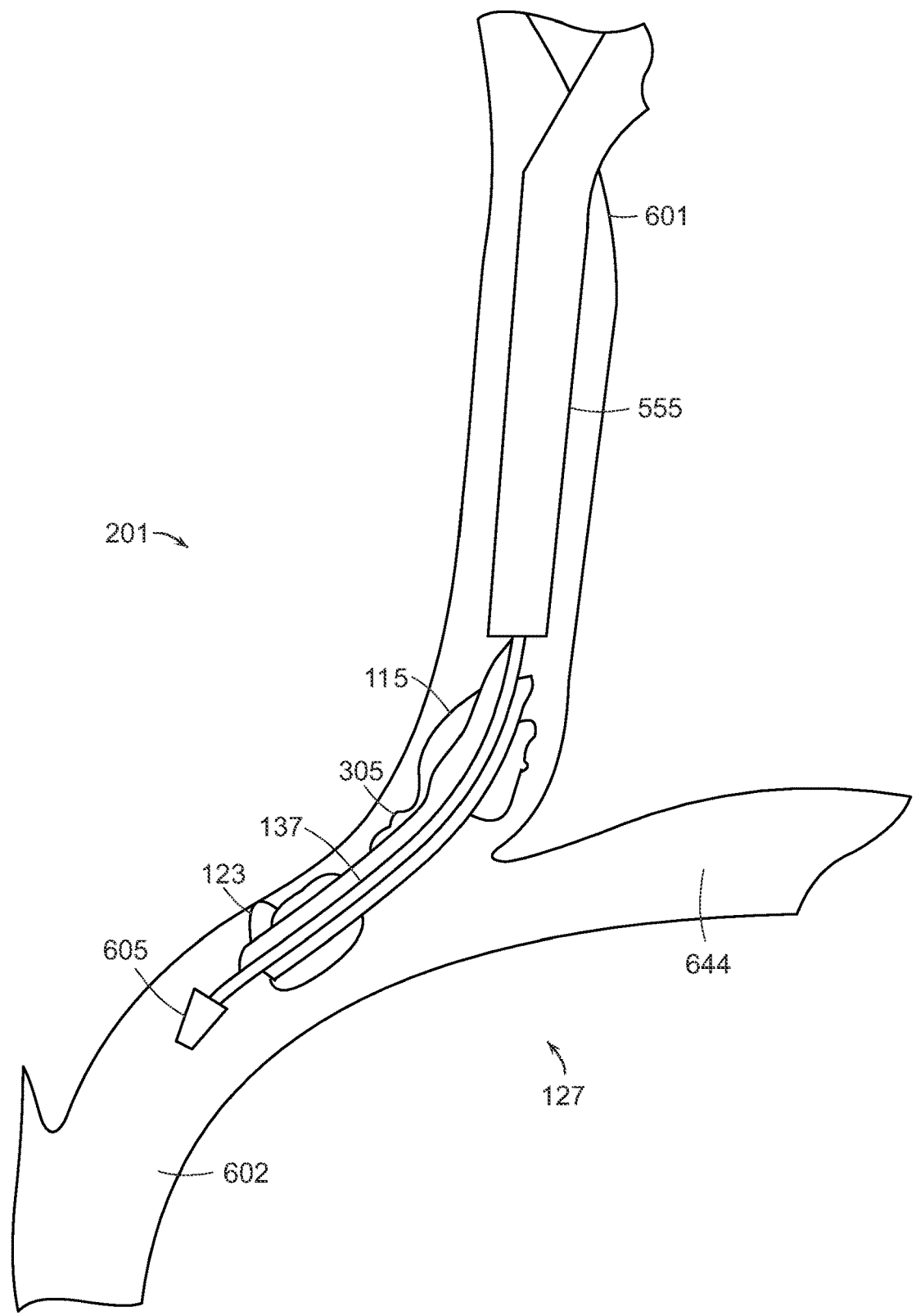
FIG. 6 shows a device with a recovery sheath being inserted into venous angle.

FIG. 6 shows a device 101 with a recovery sheath 555 being inserted into venous angle 201 of a patient. The recovery sheath 555 sits in a jugular vein 601. The catheter 103 includes an atraumatic distal tip 605. The device has passed a subclavian vein 644 and is at least partially within an innominate vein 602. Because the distal portion 127 of the catheter 103 has exited the recovery sheath 555, the proximal sealing element 115 and the distal sealing element 123 will expand. In the depicted embodiment, a collapsible membrane 305 extends between proximal sealing element 115 and the distal sealing element 123 and is also expanded to provide a bypass channel. As shown, the device provides a bypass channel extending between the proximal and distal sealing elements 115, 123, wherein the bypass channel is hydrostatically isolated from the fluid trap. The expanded proximal sealing element 115 and distal sealing element 123 will create a fluid trap and lymph will drain passively out through the port and drainage lumen 137. Preferably, the lymph will be collected in a collection vessel 139. In some embodiments, the collection vessel 139 includes a fluid separation assembly to enrich a protein content of fluid collected therein. further comprising a recovery sheath surrounding the extended body of the catheter, wherein the proximal and distal sealing elements can be restricted to a collapsed configuration by drawing the distal portion of the catheter into the recovery sheath.

Figure 7:
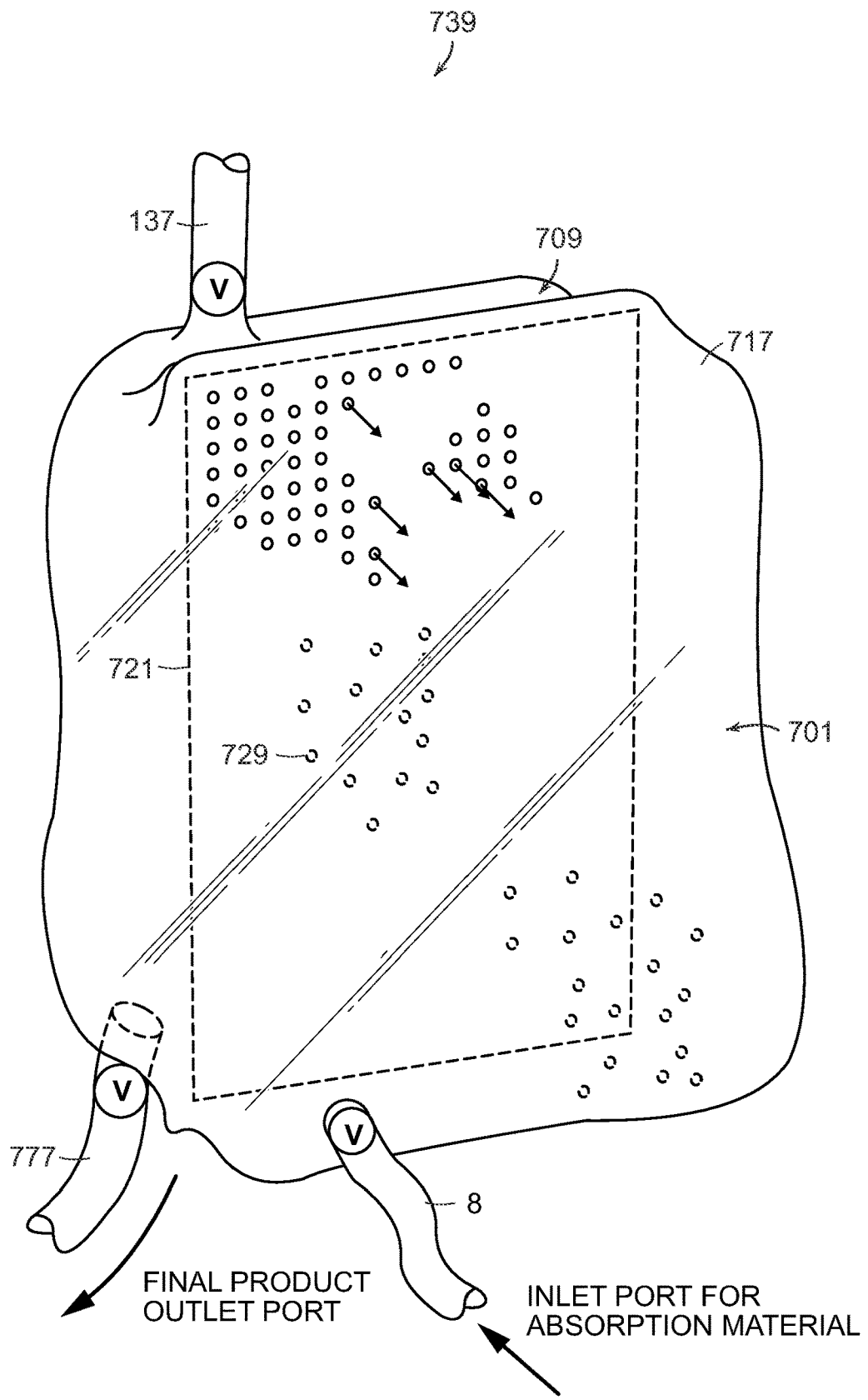
FIG. 7 shows a collection vessel with a fluid separation assembly.

FIG. 7 shows a collection vessel 739 that includes a fluid separation assembly 701 to enrich a protein content of fluid collected therein. The fluid separation assembly 701 preferably includes a first compartment 709 and a second compartment 717 separated by semi permeable membrane 721. The drainage lumen 137 drains into the first compartment 709. The second compartment 717 comprises a hypotonic solute 729.

When lymph is drained into the first compartment 709, the solute 729 draws water out of the first compartment 709, enriching the lymph for proteins. The device 101 may further include a return tube 777 for returning a collected fluid to a venous system of the patient.

Embodiments of the disclosure provide methods of treating edema using a device 101 and any of the devices, features, or embodiments shown herein.

Figure 8:
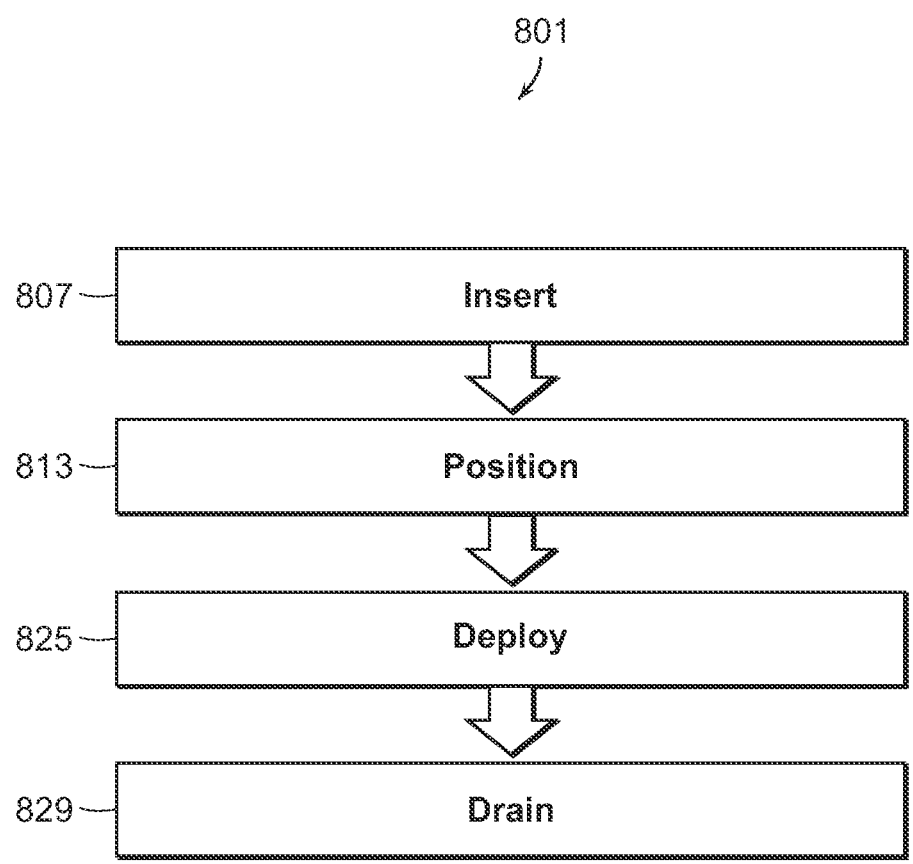
FIG. 8 diagrams a method of treating edema.

FIG. 8 diagrams a method 801 of treating edema. The method 801 includes inserting 807 a treatment catheter into vasculature of a patient and positioning 813 a distal portion of the treatment catheter in a vein near a venous angle of a patient. The method 801 further includes deploying 825 first and second expandable members on the distal portion of the catheter upstream and downstream of an outlet of a lymphatic duct to thereby create a fluid trap that includes the outlet. The treatment device presents a port within the fluid trap, the port opening to a drainage lumen that extends away from the venous angle. Further, the method 801 includes passively draining 829 lymph from the lymphatic duct, through the drainage lumen, and into a collection vessel. The lymph drains passively by means of a pressure differential between the lymphatic duct and the fluid trap that is introduced when the first and second expandable members are deployed. The collection vessel may be pressurized to a predetermined pressure. The catheter may include a bypass channel extending between the proximal and distal sealing elements, wherein when the proximal and distal sealing elements are deployed, blood flows through the vein via the bypass channel. Preferably the bypass channel is hydrostatically isolated from the fluid trap.

Figure 9:
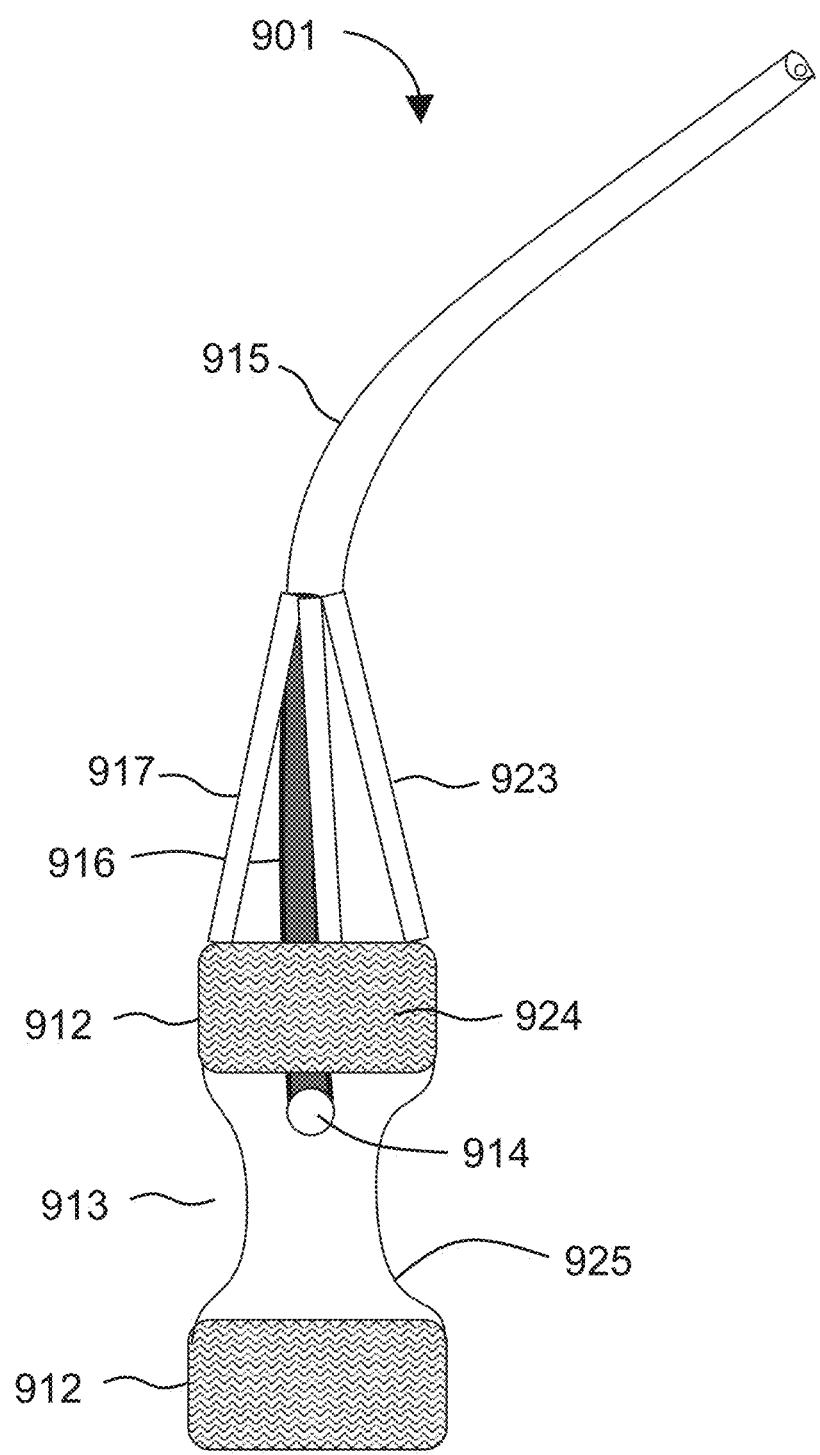
FIG. 9 shows a scaffold-based treatment device.

FIG. 9 shows a scaffold-based treatment device 901 useful to perform methods of the disclosure. The device 901 includes a catheter 915 comprising an extended body dimensioned for insertion into a vein of the venous angle of a patient. Proximal and distal sealing elements 912 are disposed about a distal portion of the catheter 915, each deployable to seal the vein to thereby define a fluid trap 913 between the proximal and distal sealing elements 912. The catheter 915 includes a membrane 925 extending between the proximal and distal sealing elements 912. The device 901 further includes a port 914 into a side of the membrane 925, between the proximal and distal sealing elements. A drainage lumen 916 extends from the port 914, along the catheter 915, and into a collection vessel connected to a proximal portion of the catheter.

Figure 10:
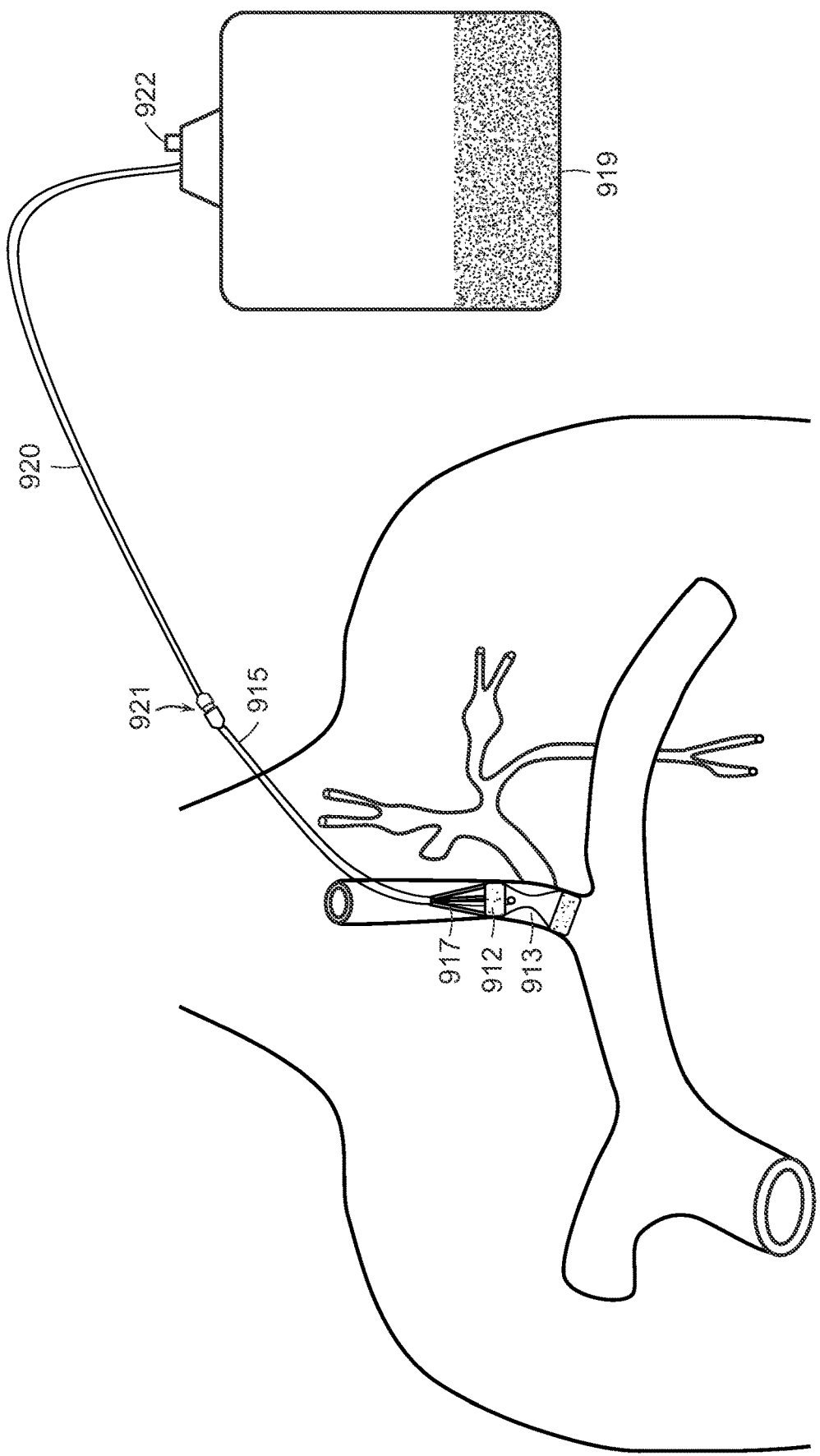
FIG. 10 shows the scaffold-based device inserted into a venous angle.

FIG. 10 shows the scaffold-based device 901 inserted into a venous angle within a patient. As shown, the device 901 is configured such that the drainage lumen 916 passively drains the fluid trap 913 into the collection vessel 919. The catheter 915 carries the two sealing elements 912 that, when deployed, define the fluid trap 913 (between the sealing elements). A port 914 on a membrane 925 sits in the fluid trap 913 and provides a fluid connection from the fluid trap 913 to a lumen 916 through the catheter 915. The catheter 915 is optionally connected to the collection vessel 919 via a Luer lock 921 connection to tubing 920. When the catheter 915 is inserted into the venous angle and the proximal and distal sealing elements 912 are deployed, the collection vessel 919 is exterior to the patient and in fluidic communication with the fluid trap 913 via the drainage lumen.

It will be appreciated that the device 901 (like other devices of the disclosure) when deployed, sequester lymph from blood and drain the lymph from the body without substantially also draining blood from the body. This allows the collection vessel 919 to be used to optionally concentrate protein in lymph and return at least some of the lymph and the protein to the patient. The collector 919 may include a return 922 through which protein-enriched lymph may be returned to the patient.

The scaffold-based device 901 preferably further includes feature such as a bypass channel to allow blood to flow while the device is deployed. Additionally, the scaffold allows the two sealing elements 912 to be released into a deployed state and/or compressed into a delivery configuration by means such as a sheath that encircles, and can slide along, the catheter 915.

Figure 11:
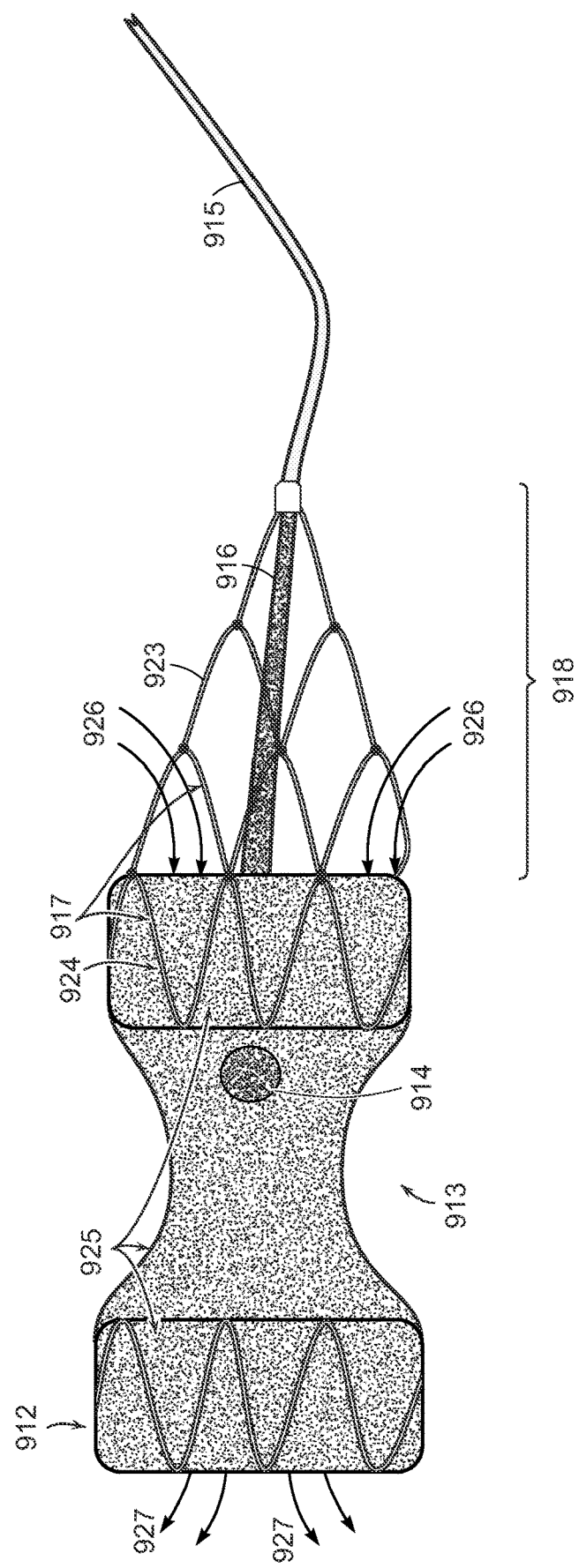
FIG. 11 gives a detailed view of the scaffold-based device.

FIG. 11 gives a detailed view of certain elements of the scaffold-based device 901. The device 901 includes a flexible or collapsible membrane extending between the two sealing elements 912. When the deployed, the sealing elements 912 and the membrane 925 define the fluid trap. The device 901 includes scaffolding 917 the form of scaffold struts 924 that directly support ends of the membrane 925 to define the sealing elements 912, as well as collapsing struts 923. The collapsing struts 923 generally define a scaffold tapered section 918. The overall tapered, or conical, geometry of the tapered section 918 allows the scaffolding 917 to be compressed by dragging the tapered section 918 into sheath.

When the collapsing struts 923 are compressed (e.g., by being dragged into a surrounding sheath), the collapsing struts 923 are squeezed closed, which collapses the sealing elements 912 and the collapsible membrane 925 into an un-deployed, or collapsed, configuration.

When in the depicted deployed configuration, the fluid trap 913 extends between the sealing elements 912 with the port 914 through the membrane 925 between the sealing elements. A lumen 916 through the catheter 915 connects the fluid trap to the external collector 919 (e.g., via connection tubing 920 connected by a Luer lock 921 to the catheter 915).

As shown, the membrane 925 provides a bypass channel and isolates flowing blood from the lymph that is being withdrawn by the device 901. Blood flows into the channel via a bypass fluid inlet 926 and leaves the device 901 through a bypass fluid outlet 927.

Various embodiments provide devices and methods for interstitial decongestion that operate to passively a liquid from a body. Devices and methods of the disclosure are configured to isolate the liquid from a second, different liquid and to drain the liquid from the body without further mixing or intermingling the liquids. Unlike prior art devices, devices and methods of the disclosure may be used to isolate lymph fluid from venous blood at the thoracic duct. In contrast, some prior art devices allowed such fluids to mix and/or withdrew both together from the body.

Devices and methods of the disclosure are useful to isolate lymph fluid from venous blood with the fluid trap. The disclosure employs the insight that different fluids such as blood and lymph play different roles within a patient and that there may be benefits in an ability to segregate or selectively address one such fluid that otherwise normally mixes with the other. For example, blood is extremely valuable to the patient. Lymph fluid where it is high in plasma proteins is also valuable. Lymph fluid that has a low protein concentration has less value and can be discarded (or concentrated to increase its value to the patient). One object of the disclosure is to provide methods and devices that may be used to treat edema and to retain or return the more valuable bodily fluids to the patient while rapidly draining less valuable fluids from interstitial tissues to thereby relieve congestion.

In some embodiments, methods and devices of the disclosure are used to remove lymph fluid from a patient. The first few hundred milliliters of lymph fluid removed with this procedure will typically have the highest protein content (maybe up to 85%) and these fluids may be returned to the patient. Once the thoracic duct has drained (e.g., at least that initial time) then the protein concentration of fresh fast flowing lymph will be lower and this fluid does not need to be returned to the patient.

In some embodiments, the treatment device has a collapsible membrane extending between the proximal and distal sealing elements, such that when the proximal and distal sealing elements are in a collapsed configuration, the collapsible membrane assumes a collapsed configuration and when the proximal and distal sealing elements are deployed, the collapsible membrane expands to provide a bypass channel extending between the proximal and distal sealing elements. When the catheter is inserted into the venous angle and the proximal and distal sealing elements are deployed, the collection vessel is exterior to the patient and in fluidic communication with the fluid trap via the drainage lumen. The catheter may include a recovery sheath surrounding the extended body of the catheter, and the method may include deploying and/or collapsing the proximal and distal sealing elements by drawing the distal portion of the catheter out of or into the recovery sheath. The first and second expandable members may be retained in a collapsed configuration by the recovery sheath during the positioning 813 step, and the method 801 may include placing the first and second expandable members in an expanded configuration by pulling the recover sheath back over the catheter.

In scaffold embodiments, the proximal and distal sealing elements comprise a scaffold. The scaffold may include a distal region configured to expand and appose a distal section of the vein; a reduced cross-sectional area section through the fluid trap; and a proximal region configured to expand and appose a proximal section of the vein.

In the method 801, the draining 829 of the lymph passively may be accomplished by means of a pressure maintained in the collection vessel that is lower than a hydrostatic pressure at the outlet before the method is performed. The method 801 may also include returning fluid into a venous system of the patient through a return tube. The method 801 may also include enriching a protein content of the drained lymph. The lymph may be protein enriched using a fluid separation assembly comprising first and second compartments separated by semi permeable membrane, wherein the drainage lumen drains to the first compartment and the second compartment comprises a hypotonic solute, wherein, when lymph is drained into the first compartment, the solute draws water out of the first compartment, enriching the lymph for proteins.

Devices and methods of the disclosure use an intravascular catheter with deployable sealing elements to create a fluid trap around an outlet of a lymphatic duct and drain lymph passively to a collection vessel that may be pressurized to a predetermined pressure or a partial vacuum. Due to the fixed pressure, the device creates a low-pressure area at the lymphatic duct, which drains lymph passively without any mechanical pump or impeller. In certain aspects, a device includes a catheter for insertion into a vein of the venous angle of a patient, with proximal and distal sealing elements deployable to seal the vein to thereby define a fluid trap around the lymphatic outlet. A port within the fluid trap opens to a drainage lumen extending along the catheter to a collection vessel. The device is configured such that the drainage lumen passively drains the fluid trap into the collection vessel.

What is claimed is:

1. A device for treating edema, the device comprising:
   a catheter comprising an extended body dimensioned for insertion into a vein of the venous angle of a patient;
   proximal and distal sealing elements disposed about a distal portion of the catheter, each deployable to seal the vein to thereby define a fluid trap comprising a continuous space between the proximal and distal sealing elements, wherein the fluid trap presents a local zone of low pressure configured to draw body fluid from a branch vessel in contact with the fluid trap into the fluid trap;
   a port into a side of the catheter positioned within the fluid trap between the proximal and distal sealing elements; and
   a drainage lumen extending from the port, along the catheter, and into a collection vessel connected to a proximal portion of the catheter, wherein the device is configured such that the drainage lumen passively drains the fluid trap into the collection vessel.

2. The device of claim 1, wherein when the catheter is inserted into the venous angle and the proximal and distal sealing elements are deployed, the collection vessel is exterior to the patient and in fluidic communication with the fluid trap via the drainage lumen.

3. The device of claim 1, wherein the collection vessel is pressurized to a predetermined pressure.

4. The device of claim 1, wherein when the proximal and distal sealing elements are deployed upstream and downstream of an outlet of a lymphatic duct, the collection vessel presents a pressure differential that draws lymph from the lymphatic duct through the lumen.

5. The device of claim 1, further comprising a bypass channel extending between the proximal and distal sealing elements, wherein when the proximal and distal sealing elements are deployed, blood flows through the vein via the bypass channel.

6. The device of claim 1, further comprising a collapsible membrane extending between the proximal and distal sealing elements, wherein when the proximal and distal sealing elements are in a collapsed configuration, the collapsible membrane assumes a collapsed configuration, and the distal portion of the catheter fits through an approximately 14 Fr trocar, and when the proximal and distal sealing elements are deployed, the collapsible membrane expands to provide a bypass channel extending between the proximal and distal sealing elements.

7. The device of claim 1, wherein the collection vessel is pressurized to less than about 10 mm Hg.

8. The device of claim 1, further comprising a recovery sheath surrounding the extended body of the catheter, wherein the proximal and distal sealing elements can be restricted to a collapsed configuration by drawing the distal portion of the catheter into the recovery sheath.

9. The device of claim 1, further comprising a bypass channel extending between the proximal and distal sealing elements, wherein the bypass channel is hydrostatically isolated from the fluid trap.

10. The device of claim 1, wherein either of the proximal and distal sealing elements comprises a scaffold.

11. The device of claim 10, wherein the scaffold comprises one selected from the group consisting of: a super elastic; a shape memory material; a wire mesh structure; a machined or laser machined tube structure; a 3D printed structure; and a monolithic structure.

12. The device of claim 1, wherein the proximal and distal sealing elements comprise a scaffold.

13. The device of claim 12, wherein the scaffold comprises: a distal region configured to expand and appose a distal section of the vein; a reduced cross-sectional area section through the fluid trap; and a proximal region configured to expand and appose a proximal section of the vein.

14. The device of claim 12, wherein the scaffold is linked to the catheter via one or more struts that collapse the scaffold when the distal portion of the catheter is pulled into a recovery sheath.

15. The device of claim 1, wherein a pressure in the collection vessel is equal to the local atmospheric pressure.

16. The device of claim 1, wherein the collection vessel is connected to a pressure reducing device so that the collection vessel may present a partial vacuum to the drainage lumen when the device is used in treatment.

17. The device of claim 1, further comprising a return tube for returning a collected fluid to a venous system of the patient.

18. The device of claim 1, wherein the collection vessel comprises a fluid separation assembly to enrich a protein content of fluid collected therein.

19. The device of claim 18, wherein fluid separation assembly comprises first and second compartments separated by semi permeable membrane.

20. The device of claim 19, wherein the drainage lumen drains to the first compartment and the second compartment comprises a hypotonic solute, wherein, when lymph is drained into the first compartment, the solute draws water out of the first compartment, enriching the lymph for proteins.

* * * * *